United States Patent [19]

Cassese

[11] Patent Number: 5,205,606

[45] Date of Patent: Apr. 27, 1993

[54] ARMREST FOR A WINDOW OF A MODERN DAY MOTOR VEHICLE

[76] Inventor: Daniel S. Cassese, 28 Elva Rd., North Weymouth, Mass. 02191

[21] Appl. No.: 800,966

[22] Filed: Dec. 2, 1991

[51] Int. Cl.⁵ .............................. B60J 9/00
[52] U.S. Cl. .............................. 296/153
[58] Field of Search .................. 296/153; 280/751

[56] References Cited

U.S. PATENT DOCUMENTS

| | | | |
|---|---|---|---|
| 2,709,620 | 5/1955 | Tinsley et al. | 296/153 |
| 2,838,340 | 6/1958 | Johnson | 296/153 |
| 3,451,717 | 6/1969 | Carter | 296/153 |
| 3,524,678 | 8/1970 | Lavenne | 280/751 |

Primary Examiner—Robert R. Song
Attorney, Agent, or Firm—Michael I. Kroll

[57] ABSTRACT

An improved armrest is provided for a modern day motor vehicle of the type having a door, a window sill, a retractable window glass and a piece of inner weather stripping. The improved armrest consists of an elongated pad having a longitudinal recess along the bottom surface. An elongated plate is affixed to the pad within the recess thereof. A mechanism is for mounting the plate with the pad to the door. The plate with the pad can extend over the window sill, the retractable window glass and the piece of inner weather stripping, allowing an arm of a person within the motor vehicle to rest upon the pad.

1 Claim, 1 Drawing Sheet

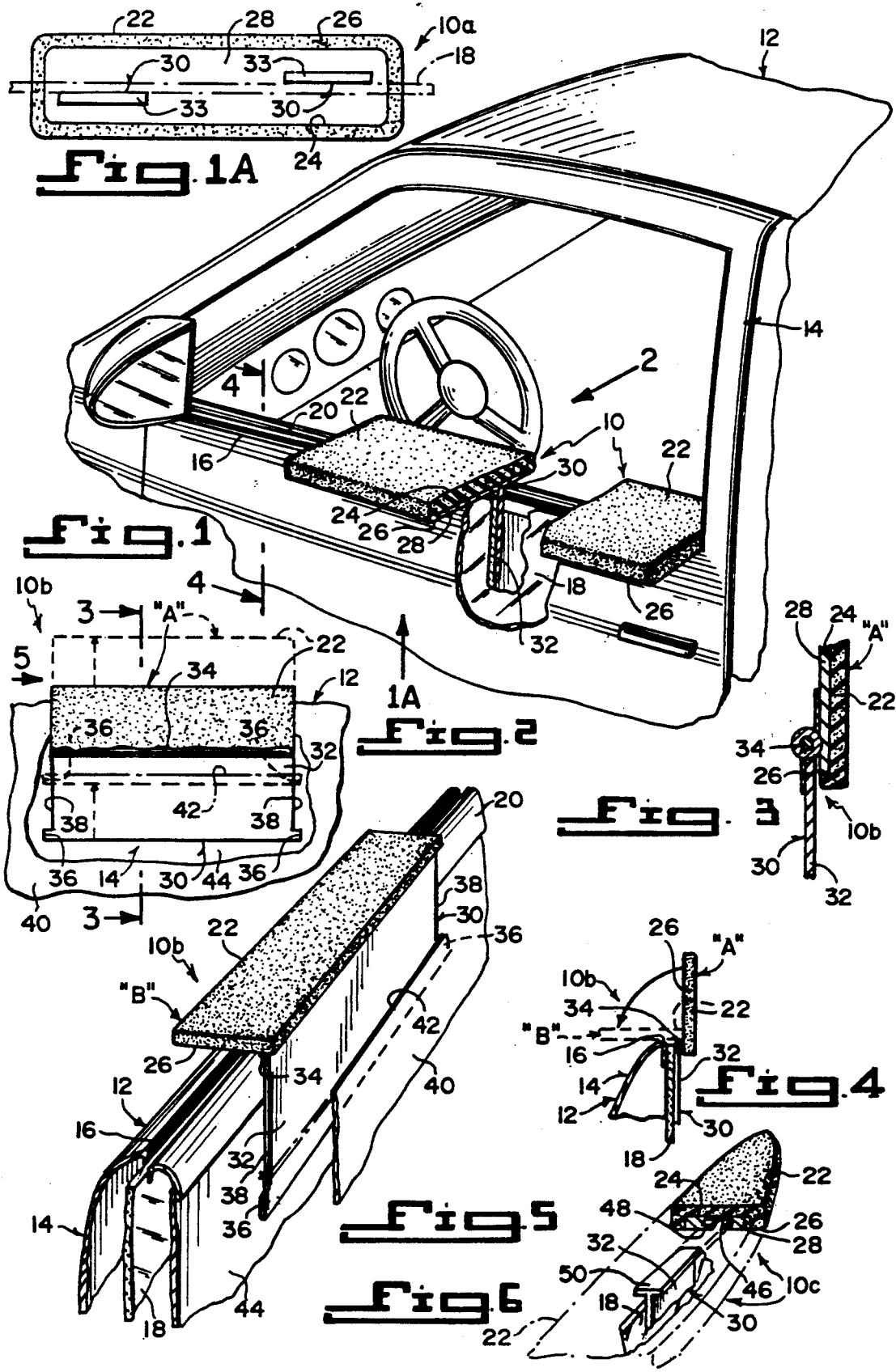

ARMREST FOR A WINDOW OF A MODERN DAY MOTOR VEHICLE

BACKGROUND OF THE INVENTION

1. Field of the Invention

The instant invention relates generally to armrests and more specifically it relates to an improved armrest for a window of a modern day motor vehicle.

2. Description of the Prior Art

Many drivers like to rest their elbows on the sill of a window in a motor vehicle door whenever the window glass is fully retracted. Especially on hot summer days, when the sill is exposed to the sun, the sill becomes heated to such a degree that it is quite uncomfortable to a bare arm.

Still other reasons may exist to interfere with the comfort of an arm resting on an unprotected sill. Numerous attempts have been made to provide a more comfortable armrest to be associated with the sill of a motor vehicle window.

Numerous armrests have been provided in prior art that are adapted to be mounted onto opened window sills in doors of motor vehicles. While these units may be suitable for the particular purpose to which they address, they would not be as suitable for the purposes of the present invention as heretofore described.

SUMMARY OF THE INVENTION

A primary object of the present invention is to provide an improved armrest for a window of a modern day motor vehicle that will overcome the shortcomings of the prior art devices.

Another object is to provide an improved armrest for a window of a modern day motor vehicle that can be mounted to a window sill of a door of the motor vehicle by an elongated leg that is both lateral or fixed and is inserted between the retracted window glass an the inner weather stripping in the door, so that the pad of the armrest will sit on the window sill.

An additional object is to provide an improved armrest for a window of a modern day motor vehicle that ca be mounted to a window sill of a door of the motor vehicle by a mounting plate inserted into a pocket in the inner panel of the door, so that the pad of the armrest which is hinged thereto can flip over to sit on the window sill.

A further object is to provide an improved armrest for a window of a modern day motor vehicle in which the pad is removable therefrom, so as to be cleaned or replaced when needed.

A still further object is to provide an improved armrest for a window of a modern day motor vehicle that is simple and easy to use, is economical in cost to manufacture and can be stored, due to its length, such as in a glove compartment or the like, when not in use.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view with parts broken away, of a first embodiment of the instant invention, installed onto a window sill of a door in a modern day motor vehicle.

FIG. 1A is a bottom view, taken in direction of arrow 1A in FIG. 1, of a second embodiment installed onto a top edge of a window glass in the motor vehicle, allowing the second embodiment to stay on the window when rolled upwards.

FIG. 2 is a side elevational view with parts broken away, taken in direction of arrow 2 in FIG. 1, of a third embodiment installed into a pocket of a panel on a door of the motor vehicle ready to be pulled up.

FIG. 3 is a cross sectional view with parts broken away, taken along line 3—3 in FIG. 2 of the third embodiment per se.

FIG. 4 is a cross sectional view with parts broken away, taken along line 4—4 in FIG. 1, of the third embodiment installed onto the window sill of the door in the motor vehicle.

FIG. 5 is a perspective view with parts broken away, taken in direction of arrow 5 in FIG. 2, of the third embodiment installed into the pocket of the panel on the door of the motor vehicle.

FIG. 6 is a perspective view with parts broken away, of a fourth embodiment installed onto the door window sill of the motor vehicle.

DETAILED DESCRIPTION OF THE PREFERRED EMBODIMENTS

Turning now descriptively to the drawings, in which similar reference characters denote similar elements throughout the several views, FIG. 1 illustrates an improved armrest 10 for a modern day motor vehicle 12 of the type having a door 14, a window sill 16, a retractable window glass 18 and a piece of inner weather stripping 20. The improved armrest 10 is a first embodiment and consists of an elongated pad 22 having a longitudinal recess 24 along the bottom surface 26. An elongated plate 28 is affixed to the pad 22 within the recess 24 thereof. A mechanism 30 is for mounting the plate 28 with the pad 22 to the door 14 so that the plate 28 with the pad 22 can extend over the window sill 16, the retractable window glass 18 and the piece of inner weather stripping 20, allowing an arm of a person within the motor vehicle 12 to rest upon the pad 22.

The pad 22 is fabricated out of a soft flexible material, such as foam rubber or the like. The plate 28 and the mounting mechanism 30 are fabricated out of a durable stiff material, such as metal, plastic or the like. The pad can be of any size, shape and color, so that the pad 22 can better match with the interior or exterior of the motor vehicle 12 and to the length of the arm of the person utilizing the improved armrest 10.

The mounting mechanism 30, as shown in FIG. 1, includes an elongated leg 32 extending downwardly from the plate 28. The leg 32 can be inserted between the retracted window glass 18 and the piece of inner weather stripping 20 on the door 14 of the motor vehicle 12, allowing the plate 28 with the pad 22 to extend over the window sill 16.

The mounting mechanism 30, as shown in FIG. 1A, in a second embodiment 10a, includes a pair of elongated legs 33, spaced apart, staggered laterally and extending downwardly from the plate 28. The legs 33 can be placed on opposite sides of the retracted window glass 18, allowing the plate 28 with the pad 22 to sit upon the top edge of the retracted window glass 18 and extend over the window sill 16. The second embodiment 10a will stay on the top edge of the window glass 18, event when the window glass is rolled upwards.

The mounting mechanism 30, as shown in FIGS. 2 through 5, in a third embodiment 10b can further include an elongated hinge 34 attached between the plate 28 and the leg 32, so that in a first position "A", the plate 28 with the pad 22 can be placed vertically with respect to the leg 32 and in a second position "B", the plate 28 with the pad 22 can be placed horizontally with respect to the leg 32. The hinge 34 is also fabricated out of the durable stiff material as the plate 28 and the leg 32.

The improved armrest 10 further includes a pair of stop tabs 36, each extending outwardly from an opposite side edge 38 of the leg 32. A panel 40 has an elongated pocket 42 therein. The panel 40 is mounted to an inner surface 44 of the door 14, so that the leg 32 can slide fit within the elongated pocket 14 in the panel 40. The plate 28 with the pad 22 in the first position "A", can, be pulled upwardly with the stop tabs 36 preventing removal from the pocket 42. The plate 28 with the pad 22 can be put in the second position "B", to extend over the window sill 16.

The mounting mechanism 30, as shown in FIG. 6, in a fourth embodiment 10c, further includes the plate 28 having a longitudinal T-shaped slot 46 along the bottom surface 48. The leg 32 has a longitudinal T-shaped member 50 along the top which will slide into the T-shaped slot 46 in the plate 28, so that the plate 28 with the pad 22 can be removed from the leg 32 to be cleaned and replaced when needed.

To sum up, there are four different embodiments of the improved armrest being 10, 10a, 10b and 10c, shown in the drawings. FIG. 1 is the first embodiment 10, in which the leg 32 is directly attached to the plate 28 and inserted between the retracted window glass 18 and the piece of inner weather stripping 20. FIG. 1A is the second embodiment 10a in which the legs 33 are staggered laterally and directly attached to the plate 28 to be placed on opposite sides of the retracted window glass 18. FIGS. 2 through 5 are of the third embodiment 10b, in which the plate 28 is hinged at 34 to the leg 32, while the leg 32 can also be inserted between the retracted window glass 18 and the piece of inner weather stripping 20 as shown in FIG. 4. The leg 32 can also be inserted within the pocket 42 in the panel 40 as shown in FIGS. 2 and 5. FIG. 6 is the fourth embodiment 10c, in which the plate 28 with pad 22 are removable from the leg 32, for better storage and cleaning.

LIST OF REFERENCE NUMBERS 10 first embodiment for improved armrest
10a second embodiment for improved armrest
10r third embodiment for improved armrest
10c fourth embodiment for improved armrest
12 modern day motor vehicle
14 door on 12
16 window sill in 14
18 retractable window glass within 16
20 piece of inner weather stripping
22 elongated pad
24 longitudinal recess in 22
26 bottom surface of 22
28 elongated plate
30 mounting mechanism
32 elongated leg
33 elongated leg lateral type for 10a
34 elongated hinge on 28 and 32 for 10b
36 stop tab
38 side edge of 32
40 panel
42 elongated pocket in 40
44 inner surface of 14
46 T-shaped slot in 28 for 10c
48 bottom surface of 28
50 T-shaped member on 32 for 10c It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved armrest for a modern day motor vehicle of the type having a door, window sill, a retractable window glass and a piece of weather stripping, said improved armrest comprising: an elongated pad of a soft flexible material having a longitudinal recess along the bottom surface thereof; an elongated plate of a durable stiff material affixed within said recess; a substantially rectangular mounting plate hingedly connected along the top edge thereof to said elongated plate; a pair of stop tabs, each extending outwardly from opposite side edge of the bottom portion of said mounting plate; a panel having an elongated pocket therein, said panel mounted to an inner surface of the door, so that said mounting plate can slide fit within said elongated pock, and said elongated plat with said pad can be pulled upward with said stop tabs preventing removable from said pocket, and said elongated plat with said pad can be put in an operative position to extend over the window sill.

* * * * *